United States Patent
Quentin et al.

(10) Patent No.: US 7,059,154 B1
(45) Date of Patent: Jun. 13, 2006

(54) METHOD FOR MAKING FLOAT GLASS, IMPLEMENTING DEVICE AND RESULTING PRODUCTS

(75) Inventors: Christophe Quentin, Eaubonne (FR); Michel Bellettre, Chantilly (FR); Robert Germar, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/926,466

(22) PCT Filed: May 5, 2000

(86) PCT No.: PCT/FR00/01237

§ 371 (c)(1),
(2), (4) Date: Jan. 9, 2002

(87) PCT Pub. No.: WO00/68156

PCT Pub. Date: Nov. 16, 2000

(30) Foreign Application Priority Data

May 7, 1999 (FR) .................................. 99 05877

(51) Int. Cl.
 *C03B 21/02* (2006.01)
(52) U.S. Cl. .................. 65/99.5; 65/99.6; 65/99.1; 65/112; 65/133; 65/176; 65/177; 65/182.4
(58) Field of Classification Search ............. 65/105, 65/112, 113, 123, 133, 148, 174–177, 77, 65/91, 93, 94, 97, 182.1, 182.4, 70, 99.5, 65/99.6, 99.1; 83/869, 15–18, 23, 53
See application file for complete search history.

(56) References Cited

U.S. PATENT DOCUMENTS

| | | | | |
|---|---|---|---|---|
| 1,560,077 A | * | 11/1925 | Gelstharp | 65/175 |
| 2,243,149 A | * | 5/1941 | Despret | 65/84 |
| 3,124,444 A | * | 3/1964 | Ritter, Jr. | 65/25.4 |
| 3,622,298 A | * | 11/1971 | Machlan et al. | 65/31 |
| 3,754,884 A | | 8/1973 | McDavid et al. | |
| 3,885,943 A | | 5/1975 | Chui | |
| 3,930,825 A | | 1/1976 | Chui | |
| 4,162,907 A | * | 7/1979 | Anderson | 65/29.17 |
| 4,749,400 A | * | 6/1988 | Mouly et al. | 65/97 |
| 6,092,392 A | * | 7/2000 | Verlinden et al. | 65/30.1 |

FOREIGN PATENT DOCUMENTS

| | | | |
|---|---|---|---|
| EP | 0 270 897 | | 6/1988 |
| EP | 0 321 838 | | 6/1989 |
| RU | 576747 | * | 9/1982 |
| RU | 726808 | * | 1/1983 |

* cited by examiner

*Primary Examiner*—Eric Hug
(74) *Attorney, Agent, or Firm*—Oblon, Spivak, McClelland, Maier & Neustadt, P.C.

(57) ABSTRACT

The present invention relates to a float process for manufacturing glass sheets, in which molten glass is poured onto a liquid support denser than the glass and then the continuous ribbon which forms is advanced toward the downstream end, this process being characterized in that the thickened edges of the ribbon are trimmed continuously in the forming zone. This process makes it possible to obtain thin glass sheets, such as sheets of film glass, with good flatness, particularly in small plants. The invention also relates to a plant for implementing the process and to the products obtained. FIG. 1.

19 Claims, 2 Drawing Sheets

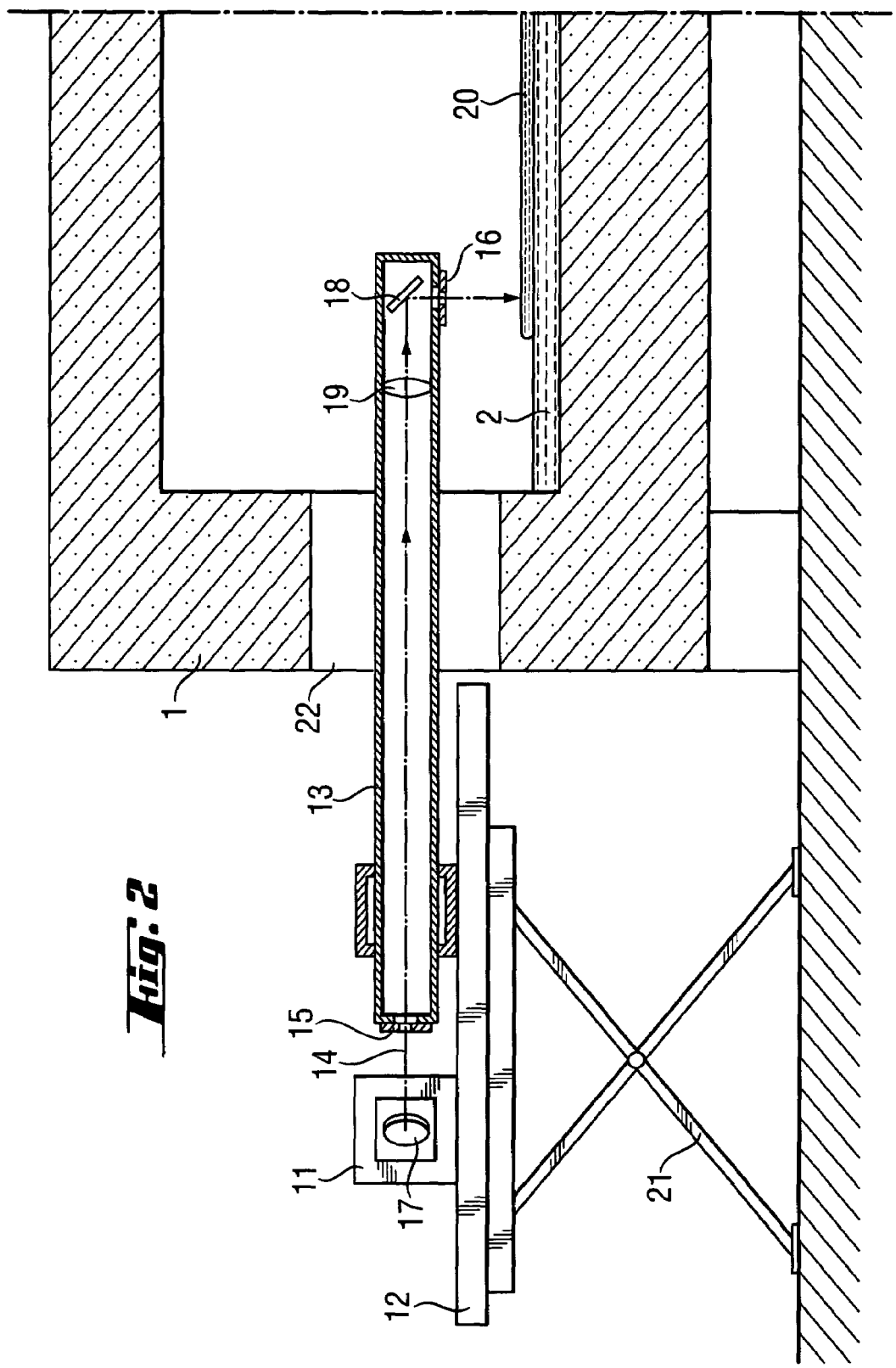

METHOD FOR MAKING FLOAT GLASS, IMPLEMENTING DEVICE AND RESULTING PRODUCTS

Figure 1:
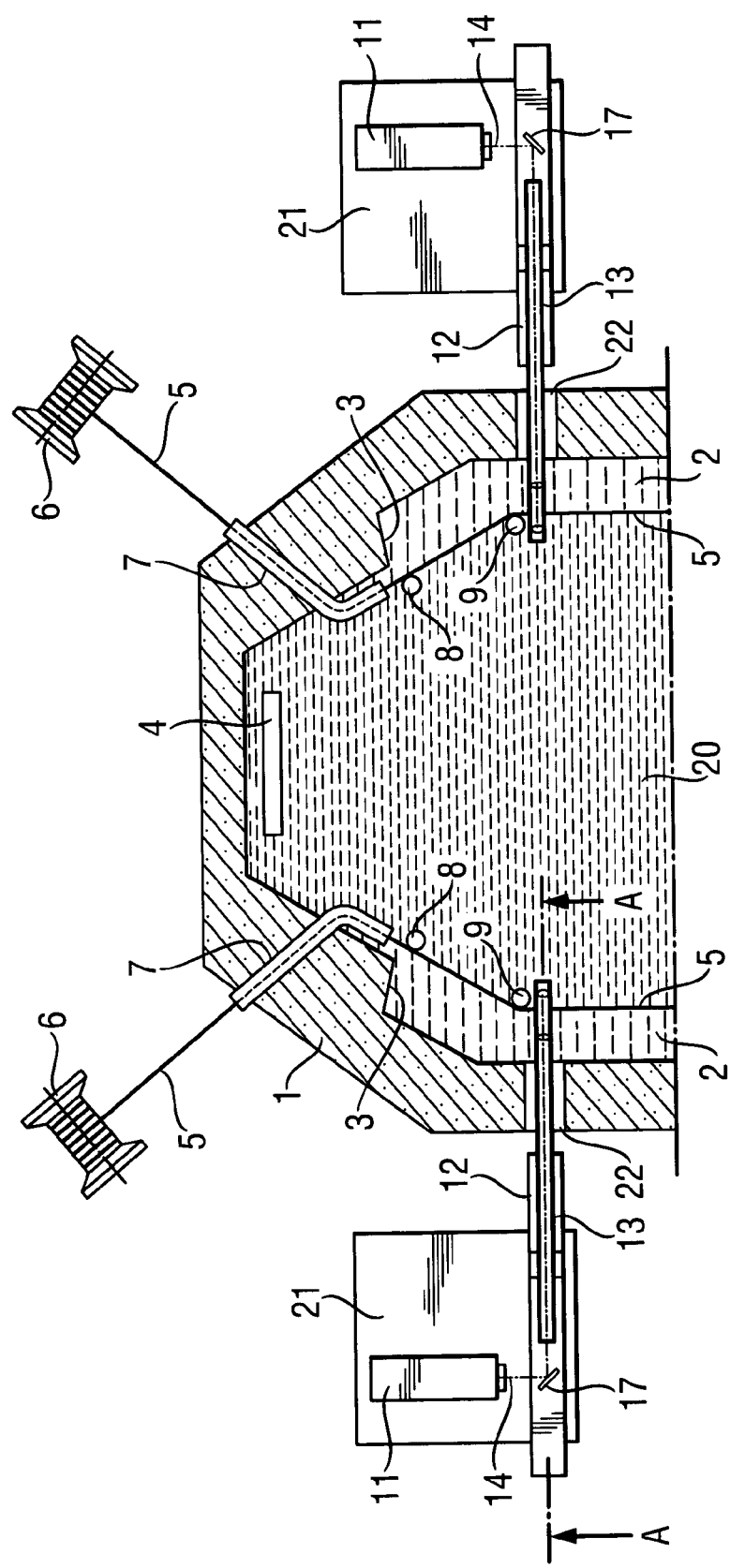

The present invention relates to a process for manufacturing float glass (or a process for manufacturing flat glass using the float technique or float process), this process making it possible to manufacture glass sheets intended notably for the production of glazing. The present invention also relates to a plant (or device) for implementing the process and to the products obtained.

The manufacture of sheet glass by the float process is carried out in the known manner by pouring molten glass onto a liquid support (or "bath") denser than the glass (for example a tin bath) and by advancing, over the surface of the bath, the glass ribbon which forms, before said ribbon, set by cooling, is cut into sheets. In the float plant (or "float"), the glass enters molten at a viscosity of about $10^{3.4}$ poise, so as to flow over the bath, the temperature at the hot end of this bath generally being about 1000–1400° C. (depending on the glass used), and spreads out in order to find its equilibrium thickness. The forming of the glass, that is to say the operation intended to give the glass ribbon its desired thickness (for example by lateral and longitudinal stretching, the forming also including, where appropriate, the necking which occurs after the lateral stretching elements), is then carried out when the glass reaches a viscosity of greater than $10^{3.7}$ or $10^4$ poise (at temperatures generally below approximately 1150° C., the viscous force being too low at higher temperatures) and before the glass leaves the bath driven by lift-out rolls downstream of the bath and before it sets (the glass setting at a viscosity of about $10^{13}$ poise at the lift-out rolls, the viscosity of the glass leaving the float being, moreover, generally greater than $10^{10}$ poise) and/or before the glass is, where appropriate, annealed.

In a standard process, the lateral stretching of the glass ribbon on the surface of the bath is carried out by gripping it laterally by top rolls positioned along the bath on each side of the glass ribbon. The plants using this process are generally plants with a high output (up to a few hundred tons of glass per day) and are tailored to the production of glass sheets having a thickness of several millimeters. On the other hand, the manufacture of glass sheets of small thickness (less than 3 mm) by this process poses problems either in terms of efficiency in large plants or in terms of flatness and optical quality of the glass in small plants.

According to another process forming the subject of patent FR 1 378 839 and of its additions, numbers 86/221, 86/222, 86/817, 87/798 and 91/543, of patent FR 2 123 096 and patent FR 2 150 249, use is made of moveable guiding elements, which are continuous and flexible (for example metal wires) and adhere to the glass along the lateral edges of the ribbon and accompany said ribbon in its movement over the bath. For small thicknesses, this process does not allow satisfactory quality to be automatically obtained either, particularly in small plants, the glass sheets obtained not always having a constant thickness and/or a satisfactory flatness.

The object of the present invention is to provide a process for manufacturing float glass that does not have the aforementioned drawbacks, in particular making it possible to improve the flatness of very thin float glass produced in small plants (i.e. plants whose dimensions generally do not exceed 20 m in length and 4 m in width and which produce less than 20 tons of flat glass per day, large plants being more voluminous and able to produce up to several hundred tons of flat glass per day). The present invention thus provides a process for manufacturing float glass tailored to the manufacture of thin glass sheets by the float technique and making it possible to obtain thin glass sheets exhibiting, in particular, good flatness, satisfactory optical quality and constant thickness, this process avoiding any deformation of the sheet during the forming and also making it possible to anneal the thin ribbon without creating residual form stresses which also run the risk of impairing the flatness of the sheet.

In the process according to the invention, molten glass is poured onto a liquid support denser than the glass, especially a bath of metal (for example molten tin or a tin alloy), and then the continuous ribbon which forms is advanced toward the downstream end, this process being characterized in that the thickened edges of the ribbon are trimmed (or cut) continuously in the forming zone.

The expression "thickened edges of the ribbon" is understood to mean in most cases the lateral edges of the ribbon, which have a substantially greater thickness than the central part of the ribbon, in particular a thickness at least twice than that of the middle of the ribbon. More generally according to the present invention, this expression also covers the edges having a substantially smaller thickness than the central part of the ribbon, such as a thickness half that of the middle of the ribbon or less.

These thickened edges generally occupy between 4 and 30% of the width of the ribbon. They are due to the float process and appear during the forming, it being possible for the addition of thickness to be greater or smaller depending on the process employed and on the type of product that it is desired to obtain. In the case of a glass ribbon having a thickness of the order of one millimeter or less at the center, these thickened edges may have for example a thickness of about 7 millimeters. Trimming these edges, which have a thickness and therefore a temperature and a stiffness that are different from those of the center of the ribbon, makes it possible to limit the deformation of the ribbon due to the effect of transverse forces and also makes it possible to prevent the appearance of residual form stresses in the ribbon, these residual stresses running the risk of impairing the flatness of the sheet during its annealing in the lehr after the bath or running the risk of embrittling the sheets and fracturing them. Instead of obtaining thickness differences of a few millimeters from one edge of the ribbon to the other, differences of a few hundredths of millimeters are thus obtained. This trimming is particularly important for small float plants or for the manufacture of thin sheets where flatness is essential. This trimming also makes it possible, where appropriate, to limit the necking phenomena observed after the lateral stretching elements and makes it possible to reduce the heating means at the exit of the bath, the ribbon being heated more uniformly and rapidly.

The trimming mentioned in the definition of the invention should not be confused with the cutting, already known, which is carried out after the forming zone. The purpose of the latter cutting, carried out on the glass that has set sufficiently to be able to be handled and/or on the annealed glass, is to give the product its final shape and dimensions, and consists in cutting the glass ribbon into sheets or in cutting a particular shape in the ribbon or the sheets. Of course, this kind of cutting to shape has nothing to do with the trimming according to the present invention which is carried out much further upstream and constitutes a kind of precutting whose function is not to replace the cutting to shape, but, on the contrary, to fulfill a very particular function not obtained by the downstream cutting to shape. Moreover, the trimming mentioned in the definition of the invention does not exclude the cutting to shape (nor does it dispense with this cutting) carried out after the bath, the latter cutting possibly always taking place, where appropriate, in order to give the product its final shape and dimensions.

The trimming according to the invention is therefore carried out during the forming, in the forming zone or working zone (also called "zone 2") corresponding to the zone where it is possible to work the product in order to give it its final thickness, the ribbon then generally having a viscosity of between $10^4$ and $10^{10}$ poise, and preferably between $10^4$ and $10^{7.6}$ poise. The temperature of the ribbon in the forming zone is usually between the point called the working point and the Littleton point, i.e. generally between 650° C. (or 700–740° C. depending on the glass) and 1150° C. In other words, the trimming according to the invention is carried out, preferably and advantageously according to the present invention, at a temperature above the Littleton point of the glass used in the float.

In practice and preferably, the edges are trimmed between the moment when (or the point where) the glass ribbon reaches its maximum width in the float (i.e. level with the final lateral stretching elements before any necking) and the moment when (or the point where) the glass ribbon separates from the bath (i.e. generally the moment when it starts to be lifted onto the lift-out rolls (LORs) placed at the exit of the bath, the point also being called the washline). Preferably and in most cases, they are trimmed just after the ribbon has reached its maximum width in the float. In particular, the edges of the ribbon are generally trimmed at a ribbon temperature of about 900 to 1100° C., right in the forming zone, or else in a zone where the glass has a viscosity of between $10^4$ and $10^{5.5}$ poise, well above the softening point of the glass, it been better for the edges of the sheet to be separated when the glass is at a temperature well above its softening temperature, trimming the glass at a temperature close to its softening point running the risk of forming waves in the ribbon. The edges are thus trimmed hot, in the still liquid glass, and without creating stresses. The edges are trimmed continuously, the trimming taking place along each of the sides of the ribbon a few centimeters (for example 5–6 cm) from the edge of the ribbon, the trimmed edges forming continuous strips.

The trimming is generally a physical or mechanical operation, and is for example advantageously carried out by means of at least one laser and/or at least one hot knife.

In the laser case, it is advantageous to use a laser (such as a $CO_2$ laser) emitting in the infrared, at a wavelength where the glass is opaque and consequently absorbs a maximum amount of light. More generally, the laser must exhibit characteristics (such as the wavelength and the power or intensity) such that the glass can absorb the energy of the laser beam that it receives and can convert it into sufficient heat to be given off at the point of impact, particularly into the liquid or vapor state. The power of the laser may, for example, be about 200 to 500 W, the efficiency generally increasing with the power. Likewise, the efficiency increases when the speed of the ribbon decreases. Thus, it is possible to raise the glass locally to temperatures above 3000° C. for ribbon speeds of, for example, about 0.5 to 1.5 m/min.

In general, the laser beam, emitted by a suitable device placed outside the float, is directed toward the point of impact in the float by a system of lenses, mirrors and windows through an optical pipe which penetrates the float chamber (for example via a lateral port of the float). Advantageously, the optical part is installed in an inner arm which can be easily removed, while leaving the outer pipe in the float, the pipe being cooled, for example by circulating water. The parts of the optical pipe which receive the laser beam must exhibit good infrared light transmission properties and if necessary can be cleaned, for example using nitrogen, by one or more nozzles (particularly for the beam exit window located in the float).

Preferably, at least two lasers as described above are used, the lasers being placed on each side of the ribbon. Each beam is introduced respectively via each pipe into a port on the side of the float and is deflected so as to strike the glass ribbon at the trimming point perpendicularly. The trimming takes place in the moving ribbon, the lasers advantageously remaining stationary.

In the knife case, it is advantageous to use a knife made of one or more materials which can be heated by resistance heating (Joule effect) and which at the same time withstand the metal bath and the glass. For example, the knife is made of graphite, molybdenum, tungsten, doped aluminum nitride, doped $SI_3N_4$, for example TiN-doped $Si_3N_4$, SiC/AlN/MoSi$_2$, etc. Preferably, a material is suitable if it withstands at least 40 hours in the float bath. The hot knife is, for example, in the form of an angular or bent piece (for example in the form of a U) through which current flows so as to heat a point or that part of the bend or of the angle having to cut the glass, this piece possibly having one or more colder or cooled parts. The tip of the knife is heated to a high temperature, notably to temperatures possibly up to approximately 1400–1500° C. (or even greater than 1500° C.), the temperature of the knife having to exceed the temperature of the glass by at least 300° C. The knife is preferably thin, for example with a thickness of less than 2 mm (in particular at the point where its cross section is smallest) in order to avoid causing instability phenomena such as, for example, waves in the glass. Likewise, the speed of the ribbon when using a knife is preferably low (especially less than 10 m/min) so as to prevent the formation of waves. The current flows in the lower part of the knife where the hot spot at the minimum cross section is produced. The knife is placed in the glass ribbon and supplied via a pipe which also holds it. The trimming is carried out in the moving ribbon, the knife advantageously remaining stationary.

Preferably, two knives as described above are used, for example two tungsten knives, the knives being placed on each side of the ribbon.

Of course, it is possible to combine knife trimming with laser trimming, the knife then being preferably placed just behind the laser in the slit created by the latter.

According to one embodiment of the invention (particularly when using a laser), a jet of gas may be directed toward the trimming point at the same time as the trimming is being carried out. This jet of gas can help to expel, where appropriate, the material heated and/or vaporized by the trimming instrument, away from the trimming line, and can be used to cool the surfaces created in order to prevent the edges from rebonding. In general, the material is expelled toward the top either in the upstream direction or in the downstream direction of the float. Preferably in the case of a laser, the jet of gas is directed toward the point of impact of the laser on the glass or very close to this point of impact, whereas in the case of a knife the jet may be directed into the slit slightly downstream of the point of contact between the knife and the glass. The jet of gas may be transverse to the movement of the glass or in the direction of movement of the glass ribbon (notably when the nozzle is placed upstream of the impact) or in the opposite direction. The flow rate of the jet may, for example, be about 2 to 19 l/min. This jet may advantageously be supplied via a tube inside the pipe used for supplying the trimming device. Thus, when the pipe is cooled, the gas remains cold. The gas used may be nitrogen for example.

Advantageously, it is also possible (especially when using a laser) to lift the sheet at the trimming point using at least one generally inclined piece referred to hereinafter as a "shoe", for example a graphite shoe, so as to break the contact between the glass and the metal bath and to facilitate the trimming. The lift, by creating a space between the sheet and the metal bath, may also allow the vaporized or liquid glass to be expelled downward and allow better separation of the edges by creating a local shear. Optionally, the trimming may be done at the point where the ribbon starts to be lifted off the bath at the exit of the float so as to use this already existing lift rather than installing one or more shoes. The shoe or shoes are preferably water-cooled so as not to stick to the glass and are advantageously placed downstream of the point of impact of the trimming device, close to this point (for example, 5 mm from the point of impact) so that the cutting takes place when the ribbon starts to lift.

In one embodiment of the present invention, the glass ribbon is stretched laterally over the surface of the bath, in the forming zone, by gripping it laterally by top rolls (usually made of steel) which are positioned along the bath on each side of the glass ribbon. In this case, the trimming instrument or instruments are preferably placed after the last top roll. The top rolls generally act at a viscosity of between $10^{4.5}$ and $10^{5.5}$ and hold the ribbon to a set width. Together with the longitudinal stretching imposed by the lift-out rolls at the exit of the float, the ribbon is stretched through a well-defined width and a well-defined thickness.

In a preferred embodiment of the present invention, the glass ribbon is stretched laterally over the surface of the bath, in the forming zone, and it is accompanied in its movement by means of continuous and flexible guiding elements made of a solid material capable of adhering to the molten glass, these elements being brought into contact with the lateral edges of the ribbon just behind the spout and then spreading out the ribbon by means of two spreader fingers placed in a zone where the glass has a viscosity of between 5000 and 50 000 poise, these spreader fingers forcing the guiding elements to diverge in order to carry out the gradual transverse stretching of the ribbon to its final width and thickness, the separation between the guiding elements then being maintained until the glass has cooled. In this embodiment, the trimming instrument or instruments are preferably placed just after the spreader fingers, close to the spreader fingers.

In general, whatever the embodiment, the edges are preferably trimmed at the final lateral stretching elements, particularly just after these elements, the trimming device (such as one or more lasers and/or one or more knives) then been placed after the last action by the lateral stretching elements (top rolls or spreader fingers).

In general too, the speed of the ribbon in the float is kept to less than 15 m/min, preferably less than 10 m/min, particularly preferably less than 5 m/min and may be down to 150 mm/min for example (the speed of advance of the ribbon may, for example, be about 250–300 mm/min for a final sheet thickness of about 1 mm). The term "final thickness" of the ribbon is understood to mean the (average) thickness of the ribbon after the guiding elements have been detached or else the thickness of the ribbon set by cooling, this thickness possibly going below 0.4 mm.

In the embodiment using continuous and flexible guiding elements, the product (P) of the value (v) of the ribbon speed (measured at the exit of the bath) and of the value (e) of its final thickness is generally less than $2.5 \times 10^{-3}$ m$^2$/s, or even $2.5 \times 10^{-4}$ m$^2$/s or $1 \times 10^{-4}$ m$^2$/s (in practice, it can go as low as $1 \times 10^{-5}$ m$^2$/s, or even lower).

The guiding elements and the spreader fingers (or retention pieces) mentioned above are especially described in patent FR 1 378 839 and its additions, in patent FR 2 123 096, in patent FR 2 150 249 and in patent FR 2 747 119 to which reference may be made for more information about these guiding elements and their advantages. The guiding elements according to the invention may, for example, be standard-type metal wires, notably wires made of stainless steel, (such as wires made of bright annealed or black annealed mild steel), or made of a refractory alloy, having a diameter of approximately 1 to 2 mm for example.

These guiding elements are generally stretched between devices such as reels located upstream and downstream of the bath and are placed in contact with the glass ribbon by means of bearing pieces or "pads" (in the form of press wheels, rollers, bars, etc.) or by means of introduction ducts also described in the aforementioned patents. The bearing pieces and the spreader fingers are produced so as to resist wear, due to the friction of the guiding elements and to corrosion by the molten glass, and may also be heated. The guiding elements are left in the edges of the glass or can be detached from the glass when the latter has reached a stage in the process when its cooling has made it sufficiently rigid. If the wires remain inserted in the edges after the spreader fingers, they can also serve for pulling away the edges of the glass after trimming.

In the embodiment using guiding elements, the angle of divergence (i.e. the angle measured between the axis of the ribbon and the straight line passing between a bearing piece and the closest retention piece lying on the same side of the ribbon) is preferably chosen to be less, in absolute value, than 25° and preferably less than 20° so as to help to improve the quality and the flatness of the glass sheets obtained, a greater angle possibly causing the glass ribbon to be stretched too abruptly.

The embodiment using the guiding elements is more economic and easier to employ than the process using top rolls within the context of the present invention. The lifting using one or more of the abovementioned shoes is, in particular, made simpler and more reliable than in the embodiment using top rolls.

On leaving the bath, whatever the embodiment, the ribbon, which has become sufficiently rigid, may be withdrawn from the bath by mechanical means without suffering damage liable to affect its flatness and its surface polish. It may be or have been annealed (for example in an annealing lehr) and/or subjected to other treatments. Next, it may be cut (possibly by laser) into sheets and/or the ribbon or the sheets may be cut to the required dimensions. Before cutting to the final shape, the product generally has a particular structure in that the lateral edges remaining after the thickened edges have been hot trimmed are slightly rounded or have a slight bead (this bead having, for example, a thickness of a few tens of microns more than the central thickness of the ribbon) and possibly a slight rib before the rounded edge.

In a novel and advantageous manner, the ribbon may be wound in line (when its thickness does not exceed 500 or 700 μm, it being possible to achieve such thicknesses by the process according to the invention, as explained below), something which hitherto has not been possible with the presence of the thickened edges.

The present invention also relates to the rolls of film glass (i.e. glass with a thickness of less than 0.7 mm and preferably less than 0.4 mm) conceived within the present invention and able to be obtained by the process according to the invention. These rolls have advantages, especially in terms of handling and transportation, in addition to the advantages due to the film glass. Preferably, to avoid fatigue, damage and production problems, such rolls according to the invention have a ratio of the (internal) radius of the wound package to the thickness of the glass (the values being expressed in SI units) of greater than 1000, preferably greater than 2500 or 3500, or possibly even greater than 10 000. Also to avoid damage problems, suitable inserts may be placed between the turns of the wound package.

According to one advantageous embodiment of the invention, the ribbon may undergo a toughening operation; in particular, the edges of the ribbon, which have possibly been weakened by the trimming, may be chemically toughened, either in line (for example, before the sheets are cut to the required dimensions or before the ribbon is wound) or after the ribbon has been wound. The advantage of carrying out the toughening on the glass roll or wound package according to the invention is, in particular, the fact that the toughening may be carried out more easily than on the ribbon in line and at the same time over a great length of glass ribbon. The edges of the ribbon are, for example, toughened by dipping the lateral parts of the wound package into a suitable bath (for example in a tank of molten salt, such as a potassium salt) for the time needed to perform the toughening (and the possible healing) of those parts (this time being, for example, about one day or more).

As mentioned above, the invention applies particularly well to the manufacture of thin glass sheets having, for example, a thickness of less than 2.5 mm and in particular a thickness of less than 0.7 or 0.4 mm (film glass). There are many applications of the film glass obtained according to the invention and possibly presented in the form of rolls; in particular, the film glass according to the invention can be used as protection (protection of food, protection from scratches, electrical protection, protection for providing impermeability to gases, liquids, chemicals, etc.), as decoration (after treatment, such as screen printing, sputtering, etc., in order to deposit layers such as a mirror, enamel, etc.), the glass being in this case applied, for example, by unwinding a roll according to the invention against a surface which it is desired to decorate, as a carrier or promoter of a function (an optical function, a chemical function, an adhesion-promoting function, an anti-fouling or anti-graffiti function, an anti-rain function, an anti-bacterial function, etc.), as an identifier or seal (for example as a watermark incorporated into banknotes and coated with a layer allowing the banknote to be identified, or as a seal which is incorporated into a bottle and which breaks when it is opened in order to authenticate the original contents of the bottle, or as an insert placed in a card and making the latter unfalsifiable, falsification of the card resulting in the glass breaking, etc.), as packaging, as a storage medium for optical or magnetic data, as a screen, etc.

In the process according to the invention, flat glass may be advantageously manufactured from all the compositions normally used in float processes (conventional silica-soda-lime glasses). In the embodiment using guiding elements, it is also possible to use glasses having a working range (the difference between the temperature at which the glass has a viscosity of 1000 poise and the temperature at which the glass has a viscosity of $10^6$ poise) which is shorter, especially less than 350° C. and particularly less than 300° C., the process in this embodiment making it possible to form the glass to its final thickness more rapidly.

Glasses that can be used advantageously in the process according to the invention are, for example, the glasses described in patents and patent applications EP 526 272, EP 576 362, FR 2 727 399, FR 2 725 713, FR 2 725 714, WO-96/11888 and WO-96/11887.

The products obtained according to the process of the invention exhibit good flatness (the camber over a length of about 50 cm not generally exceeding 100 μm) and a relatively constant thickness. The optical quality of the glasses obtained is also at least equal to or even superior to that of the glasses obtained according to the current processes. As indicated above, the necking of the glass ribbon is very slight and does not result in optical defects. Nor does the ribbon obtained present difficulties in annealing. The process according to the invention is also economic and particularly efficient.

The present invention also relates to a plant (float furnace or float) suitable for implementing the process according to the invention, this plant comprising at least one trimming device (for example using one or more lasers and/or one or more knives) preferably placed after the final action by the lateral stretching elements (top rolls or spreader fingers). The plants according to the invention, already explained to a great extent in the above description of the invention, are also illustrated below, through a nonlimiting example with reference to the appended FIGS. 1 and 2 which show:

FIG. 1: a partial schematic view from above of a plant according to the invention;

FIG. 2: a partial schematic section on the line A—A of the plant in FIG. 1.

The plants according to the invention are preferably short low-output (less than 20 t/d) plants.

The plant generally comprises a tank, part of the enclosure of which is illustrated at 1, this tank containing a metal bath 2, such as a tin bath for example. The upstream part of this tank may have diverging walls or "restrictors" 3 in the direction of advance of the glass. The means for heating the tank have not been shown.

The molten glass is fed at the upstream end of the tank into the zone depicted at 4. The glass thus poured in spreads out over the bath between the diverging walls under the action of gravity and of the pulling exerted downstream. Wires 5 (the guiding elements), coming for example from reels 6, are then introduced via the upper face into the edges of the sheet before the latter has left the diverging walls, or immediately after (or even at the spout 4). Each wire may be fed via a wire guide or duct 7 which may possibly impose a change of direction thereon, this arrangement making it possible, where appropriate, to place the reels laterally with respect to the furnace and to feed the wire in the desired position, and then each wire encounters a bearing piece 8 which subjects it to a downwardly directed force in order to insert it into the glass.

Downstream of the spreading-out zone there are spreader fingers 9 which force the wires to diverge and then prevent them from coming closer together due to the action of surface tension forces. The wires bear on these spreader fingers and keep the ribbon 20 (shown only in FIG. 2) to the width corresponding to the final thickness to be obtained. The wires accompany the ribbon while it cools down in the downstream zone of the bath (not shown) until the ribbon is sufficiently rigid (the ribbon temperature being, for example, less than 600° C.).

Just after the spreader fingers, the thickened edges of the glass ribbon are trimmed using $CO_2$ lasers 11. The laser beam 14 emanating from a $CO_2$ laser 11 placed outside the float, along each side of the float, is sent via mirrors 17, 18, lens 19 and windows 15, 16 along an optical pipe 13 penetrating the float via a lateral (side-sealing) port 22. The optical pipe is cooled and rests on an optical bench 12, the whole assembly being placed on a raiseable table 21 in order to adjust the position of the trimming system.

The process according to the invention makes it possible to manufacture thin glass sheets that can be used especially in the automobile field, the electronics field, in plasma screens, magnetic hard disks, etc.

The invention claimed is:

1. A float process for manufacturing glass sheets comprising:
    pouring molten glass onto a liquid support denser than the glass;
    forming a continuous glass ribbon from the molten glass;
    advancing the continuous glass ribbon toward a downstream end; and
    continuously trimming thickened lateral edges of the glass ribbon in a forming zone at a temperature well above the softening point of the glass while said thickened lateral edges are in contact with said liquid support.

2. The process as claimed in claim 1, wherein the lateral edges are trimmed between a moment when the glass ribbon reaches its maximum width and a moment when the glass ribbon separates from the liquid support.

3. The process as claimed in claim 1, wherein the lateral edges are trimmed at a temperature above a Littleton point of the glass.

4. The process as claimed in claim 1, wherein the lateral edges are trimmed with at least one laser and/or at least one hot knife.

5. The process as claimed in claim 1, further comprising:
    directing a jet of gas toward a trimming point at a same time as trimming is being carried out.

6. The process as claimed in claim 1, further comprising:
    stretching the glass ribbon laterally over a surface of the liquid support in the forming zone;
    providing continuous and flexible guiding elements made of a solid material capable of adhering to and moving with the glass ribbon;
    spreading out the ribbon using two spreader fingers; and
    performing the trimming step using a trimming instrument or instruments placed just after the spreader fingers.

7. The process as claimed in claim 1, wherein a speed of the ribbon is less than 10 m/min.

8. The process as claimed in claim 1, further comprising: chemically toughening the lateral edges of the ribbon.

9. The process as claimed in claim 1, wherein said temperature is at least 900 degrees Celsius.

10. The process as claimed in claim 1, wherein the glass ribbon obtained forms a film of low thickness or is cut into sheets.

11. A device comprising:
    a liquid support denser than glass;
    a glass pouring unit configured to pour molten glass onto said liquid support;
    a glass ribbon forming unit configured to form a continuous glass ribbon from the molten glass; and
    at least one trimming device placed in the forming zone configured to continuously trimming thickened lateral edges of the glass ribbon at a temperature above the softening point of the glass while said thickened lateral edges are in contact with said liquid support.

12. The device as claimed in claim 11, wherein said device has dimensions not exceeding 20 m in length and 4 m in width and produces less than 20 tons of flat glass per day.

13. A float process for manufacturing glass sheets comprising:
    pouring molten glass onto a liquid support denser than the glass;
    forming a continuous glass ribbon from the molten glass;
    advancing the continuous glass ribbon toward a downstream end; and
    continuously trimming thickened lateral edges of the glass ribbon in a zone where the glass has a viscosity of between $10^4$ and $10^{5.5}$ poise.

14. A float process for manufacturing glass sheets comprising:
    pouring molten glass onto a liquid support denser than the glass;
    forming a continuous glass ribbon from the molten glass;
    advancing the continuous glass ribbon toward a downstream end; and
    continuously trimming thickened lateral edges of the glass ribbon just after the ribbon reaches its maximum width while said thickened lateral edges are in contact with said liquid support.

15. The process as claimed in any one of claims 1, 13, or 14 further comprising:
    winding the glass ribbon to form a roll of glass.

16. A float process for manufacturing glass sheets comprising:
    pouring molten glass onto a liquid support denser than the glass;
    forming a continuous glass ribbon from the molten glass;
    advancing the continuous glass ribbon toward a downstream end;
    continuously trimming thickened lateral edges of the glass ribbon in a forming zone at a temperature well above the softening point of the glass;
    directing a jet of gas toward a trimming point at a same time as trimming is being carried out.

17. A float process for manufacturing glass sheets comprising:
    pouring molten glass onto a liquid support denser than the glass;
    forming a continuous glass ribbon from the molten glass;
    advancing the continuous glass ribbon toward a downstream end;
    lifting the glass ribbon at a point where the trimming step is performed so as to break contact between the glass ribbon and the liquid support; and
    continuously trimming thickened lateral edges of the glass ribbon in a forming zone at a temperature well above the softening point of the glass.

18. A float process for manufacturing glass sheets comprising:
    pouring molten glass onto a liquid support denser than the glass;
    forming a continuous glass ribbon from the molten glass;
    advancing the continuous glass ribbon toward a downstream end;
    stretching the glass ribbon laterally over a surface of the liquid support in the forming zone;
    providing continuous and flexible guiding elements made of a solid material capable of adhering to and moving with the glass ribbon;
    spreading out the ribbon using two spreader fingers; and
    continuously trimming thickened lateral edges of the glass ribbon in a forming zone at a temperature well above the softening point of the glass using a trimming instrument or instruments placed just after the spreader fingers.

19. A device comprising:
    a liquid support denser than glass;

a glass pouring unit configured to pour molten glass onto said liquid support;

a glass ribbon forming unit configured to form a continuous glass ribbon from the molten glass; and at least one trimming device placed in the forming zone configured to continuously trimming thickened lateral edges of the glass ribbon at a temperature above the softening point of the glass while said thickened lateral edges are lifted so as to break contact between the glass ribbon and the liquid support.

* * * * *